March 9, 1943.  W. J. McDONALD  2,313,388
VEHICLE IMPEDING DEVICE
Filed May 9, 1941

INVENTOR
William J. McDonald
BY Alfred R. Fuchs
ATTORNEY

Patented Mar. 9, 1943

2,313,388

UNITED STATES PATENT OFFICE 2,313,388

VEHICLE IMPEDING DEVICE

William J. McDonald, Kansas City, Mo.

Application May 9, 1941, Serial No. 392,759

11 Claims. (Cl. 256—1)

My invention relates to means for impeding vehicles, particularly wheeled vehicles, or vehicles with self-laying tracks, or treads.

It is a particular purpose of my invention to provide means for impeding vehicles, such as automobiles, trucks, motorcycles, tanks, tractors, and other vehicles, so as to interfere with their operation and delay their progress. The principal object of the invention is to provide such impeding means in order to interfere with the progress of such vehicles as above referred to, used for purposes of war, to prevent rapid progress of such vehicles in sudden rapid attacks of a lightning-like character.

My invention comprises a plurality of impeding objects, which may be placed on the ground, and which, preferably, are of a cup-like, or curved, character, that have upwardly curved arms extending from a base of sufficient size that the objects can be placed anywhere on the ground, in plowed fields, in roadways, or in open spaces, and even in wooded areas where passages or paths might exist, that are large enough for a vehicle of any character to pass through. The objects are duplicates and are, preferably, of a character that can be made by mass production methods and which require no extensive period of time to put the same in position, being merely strewn about on the ground with the concave side thereof upwardly when placed in position to act as defensive means against wheeled vehicles, tractors of the self-laying track type, and the implement of war commonly known as a tank. The depth of the zone in which these would be placed and their spacing would, of course, depend upon conditions and upon the type of vehicle, or other implement of warfare that it is be trapped, or interfered with, by the impeding devices.

It is a further purpose of my invention to provide impeding devices that have means that is adapted to catch in solid rubber or inflatable rubber tires, or other similar objects, in such a manner as to be difficult to disengage therefrom, and which, when so disengaged, will cause considerable damage to the rubber, or similar material, of the tire, or similar member, engaged thereby. One of the important uses of the invention would be on air field runways, as these devices would be substantially invisible from the air, or from any appreciable horizontal distance, if properly camouflaged. Obviously that could be readily done by dipping, or painting, the objects to blend with the color of the surrounding objects, or the object, or surface, upon which the same may be resting.

Other objects and advantages of my invention will appear as the description of the drawing proceeds. I desire to have it understood, however, that I do not intend to limit myself to the particular details shown or described, except as defined in the claims.

Figure 1:
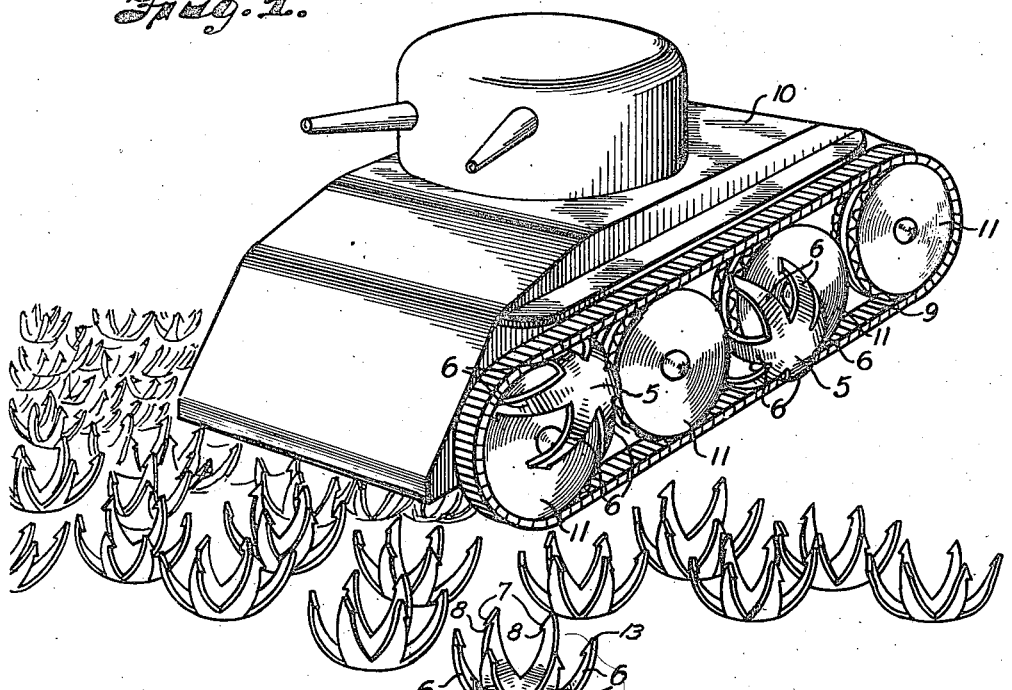
Fig. 1 is a perspective view showing a tank somewhat diagrammatically and the impeding objects forming the subject matter of my invention strewn on an area over which such tank is attempting to pass.
Figure 2:
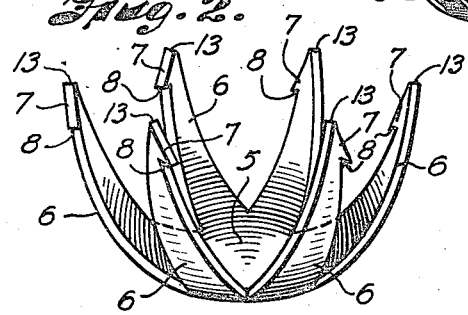
Fig. 2 is a perspective view of one of the impeding objects shown in Fig. 1.
Figure 3:
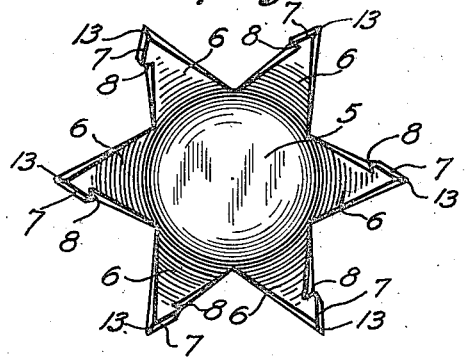
Fig. 3 is a top plan view thereof.

Referring in detail to the drawing, my invention comprises members of sheet metal that have a central body portion 5 of a concavo-convex character, from which the curved arms 6 extend, said arms tapering toward their outer ends to form a sort of spider-like cup-shaped member that has a central body portion with a plurality of arms, or legs, thereon. Each of the arms, or legs, is provided with a barb, or prong, 7 of a gig-like character, that is undercut as at 8, so as to readily catch in any object that it might engage, such as objects of rubber, or similar material, said prongs being so made that the same will not readily disengage from any such objects after fastening themselves therein.

The cup-shaped, or spider-like, members are, preferably, made out of sheet metal of sufficient strength and resiliency and of such quality that the same will maintain their shape, even when run over by a wheeled vehicle, and if desired, may be made of steel that can be tempered, so that the same will have a spring-like character. The tendency of the impeding members is such that the same will tend to remain in such a position that the arms, or legs, 6 extend upwardly from the body portion 5 with the same lie on the ground, and said members have a tendency, due to the curved character of the arms and of the body portion 5, to roll back into position with the body portion downward after being dislodged therefrom. However, if one or more of the arms is engaged near its outer pointed end 13, or anywhere not near the central body portion 5, by a wheel of a vehicle, or any other object having weight sufficient to tilt the same, the tendency will be for the impeding element so engaged to assume the position shown in Fig.

1, where one of the objects is shown with one of the arms 6 under the continuous tread 9 of a self-laying track vehicle, similar to an army tank, indicated by the numeral 10 in Fig. 1, with the other arms, or legs, projecting inwardly toward the vehicle, so as to tend to entangle themselves with and between the various wheels 11 thereof.

One such object is shown in Fig. 1 as having traveled around with a wheel and entangled itself between the self-laying track portion and the forward wheel 11 of the vehicle 10. While the vehicle 10 is shown somewhat diagrammatically in Fig. 1, and the wheels are shown as being all of substantially the same size, this is immaterial, as far as the operation of the device is concerned. Also it is immaterial whether the wheels are large or small. It is desirable in the use of the invention, in order to prevent the passage of wheeled vehicles having wheels of various sizes, to provide these objects in various sizes, and scatter the various sized objects in a zone so that these will work in the most efficient manner with different sized wheels. It will be obvious that the impeding member, when carried along by a wheel, or by a continuous track laying tread member, will assume many other positions than those shown in Fig. 1, all of which would interfere seriously with the operation of the vehicle and many of which would damage the driving mechanism thereof, at least sufficiently to seriously impede the progress of the vehicle and prevent rapid movements thereof, such as are desirable in modern warfare.

Figure 4:
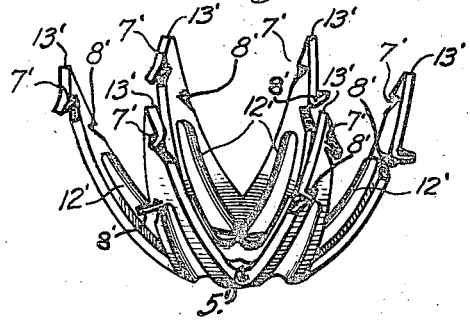
Fig. 4 is a perspective view of a modification.

In Fig. 4 a modification of the invention is shown, in which the body portion 5' is provided with arms, or legs, 6', which are shown as being provided with stiffening ribs 12', struck out of the material of which the impeding device is made, this being done with a die in a well known manner and making possible the use of somewhat lighter gauge sheet metal for the purpose of forming the objects. It is, of course, desirable that my invention be made in such a manner and of such material that large quantities of these impeding objects can be produced rapidly, and for that reason sheet material is preferred, and die-shaping of the objects is, preferably, utilized to manufacture the same.

The form of the invention shown in Fig. 4 is particularly effective, in that it is provided with not only the tapering ends 13', but also with outer barbs 7' that extend at an acute angle to the body of the arms, or legs, 6', and are adapted to entangle themselves and catch in rubber tires, whether of a solid or pneumatic type, or rubber or fabric members provided on self-laying tracks, or similar objects. Furthermore, in the form of the invention shown in Fig. 4, prongs, or barbs, 8' are shown, which project substantially perpendicularly to the legs, or arms, 6', and these serve to entangle the device with moving objects, and also to anchor the device in the ground to prevent slippage of the same when it has turned to a position such as that shown in Fig. 1, but with a leg, or legs, 6' in engagement with the ground, or other surface, on which the object may be placed. Said prongs, or barbs, 8' are spaced from the prongs, or barbs, 7' and are struck out from the opposite side edges of the arms 6' to those having the prongs, or barbs, 7' struck out therefrom.

What I claim is:

1. A vehicle impeding device, comprising a central body portion having a convexly curved side and having a plurality of arms thereon projecting away from said convexly curved side of said body portion, said body portion being adapted to be mounted rockably on a surface on said convexly curved side, said device having a normal tendency to assume a position with said arms projecting upwardly from said central body portion and being tiltable on said convexly curved side upon engagement of a vehicle with an arm on one side thereof to project arms on the other side thereof toward said vehicle.

2. A vehicle impeding device, comprising a central body portion forming a base the under side of which is shaped to be tiltable upon a surface on which it is placed and having a plurality of arms thereon projecting divergently from the upper side of said base, said device having a normal tendency to assume a position with said arms projecting upwardly and outwardly from said central body portion and being tiltable upon engagement of a vehicle with an arm on one side thereof to project arms on the other side thereof toward said vehicle.

3. A vehicle impeding device, comprising a concavo-convex central body portion having a plurality of curved arms thereon projecting divergently from the concavely curved side of said body portion, said body portion being adapted to be mounted rockably on a surface on said convexly curved side, said device having a normal tendency to assume a position with said arms projecting upwardly from said central body portion and being tiltable on said convexly curved side upon engagement of a vehicle with an arm on one side thereof to project arms on the other side thereof toward said vehicle.

4. A vehicle impeding device, comprising a cup-like central body portion and having a plurality of elongated, longitudinally curved entangling members arranged to project in an annular series from the rim of said central body portion, said body portion being adapted to be mounted rockably on a surface on the side thereof opposite said entangling members, said device having a normal tendency to assume a position with said members projecting upwardly from said central body portion and being tiltable on the side thereof opposite said entangling members upon engagement of a vehicle with a member on one side thereof to project entangling members on the other side thereof toward said vehicle.

5. A vehicle impeding device, comprising a central body portion of sheet metal forming a base the under side of which is shaped to be tiltable upon a surface on which it is placed and having a plurality of arms thereon projecting divergently from the upper side of said base, said device having a normal tendency to assume a position with said arms projecting upwardly and outwardly from said central body portion and being tiltable upon engagement of a vehicle with an arm on one side thereof to project arms on the other side thereof toward said vehicle, said arms being provided with longitudinally extending stiffening means thereon.

6. A vehicle impeding device, comprising a central body portion of sheet metal having a convexly curved side and having a plurality of curved integral arms thereon projecting away from said convexly curved side of said body portion, said body portion being adapted to be mounted rockably on a surface on said convexly curved side, said device having a normal tendency to assume a position with said arms projecting upwardly from said central body portion and being tiltable on said convexly curved side upon engagement of a vehicle with an arm on one side thereof to project arms on the other side thereof toward said vehicle, said arms having longitudinally extending stiffening ribs formed therein.

7. A vehicle impeding device, comprising a cup-like central body portion and having a plurality of curved arms thereon projecting from the rim of said central body portion, said body portion being adapted to be mounted rockably on a surface on the side thereof opposite said arms, said device having a normal tendency to assume a position with said arms projecting upwardly from said central body portion and being tiltable on the side thereof opposite said arms upon engagement of a vehicle with an arm on one side thereof to project arms on the other side thereof toward said vehicle, said arms having gig-like barbs thereon adjacent the extremities thereof.

8. A vehicle impeding device, comprising a concavo-convex central body portion having a plurality of curved arms thereon projecting divergently from the concavely curved side of said body portion, said body portion being adapted to be mounted rockably on a surface on said convexly curved side, said device having a normal tendency to assume a position with said arms projecting upwardly from said central body portion and being tiltable on said convexly curved side upon engagement of a vehicle with an arm on one side thereof to project arms on the other side thereof toward said vehicle, said arms having ground gripping means thereon.

9. A vehicle impeding device, comprising a concavo-convex central body portion of sheet metal having a convexly curved side and having a plurality of integral, curved sheet metal arms thereon projecting divergently from the concavely curved side of said body portion, said body portion being adapted to be mounted rockably on a surface on said convexly curved side, said device having a normal tendency to assume a position with said arms projecting upwardly from said central body portion and being tiltable on said convexly curved side upon engagement of a vehicle with an arm on one side thereof to project arms on the other side thereof toward said vehicle, said arms being arranged in an annular series and each having ground gripping means thereon.

10. A vehicle impeding device, comprising a central body portion forming a base the under side of which is shaped to be tiltable upon a surface on which it is placed and having a plurality of arms thereon projecting divergently from the upper side of said base, said device having a normal tendency to assume a position with said arms projecting upwardly and outwardly from said central body portion and being tiltable upon engagement of a vehicle with an arm on one side thereof to project arms on the other side thereof toward said vehicle, each of said arms having a plurality of barbs thereon.

11. A vehicle impeding device, comprising a cup-like central body portion and having a plurality of curved longitudinally tapering arms thereon projecting from the rim of said central body portion, said body portion being adapted to be mounted rockably on a surface on the side thereof opposite said arms, said device having a normal tendency to assume a position with said arms projecting upwardly from said central body portion and being tiltable on the side thereof opposite said arms upon engagement of a vehicle with an arm on one side thereof to project arms on the other side thereof toward said vehicle, said arms each having a barb thereon extending at an acute angle to the surface of said arm and a barb thereon extending perpendicularly to the outer surface of said arm.

WILLIAM J. McDONALD.